United States Patent
Yamauchi et al.

(10) Patent No.: US 9,139,671 B2
(45) Date of Patent: Sep. 22, 2015

(54) HYDROPHILIC THICKENING AGENT AND METHOD OF PRODUCING SAME

(75) Inventors: Yoh Yamauchi, Osaka (JP); Tsuyoshi Masuda, Himeji (JP); Akio Nakatsuka, Himeji (JP); Ayami Wajima, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 13/981,200

(22) PCT Filed: Dec. 8, 2011

(86) PCT No.: PCT/JP2011/078467
§ 371 (c)(1),
(2), (4) Date: Aug. 8, 2013

(87) PCT Pub. No.: WO2012/111224
PCT Pub. Date: Aug. 23, 2012

(65) Prior Publication Data
US 2013/0324670 A1    Dec. 5, 2013

(30) Foreign Application Priority Data
Feb. 14, 2011 (JP) ................................. 2011-028950

(51) Int. Cl.
*C08F 120/06* (2006.01)
*C08F 220/00* (2006.01)
*C08F 8/00* (2006.01)
*C08F 2/32* (2006.01)
*C09K 3/00* (2006.01)
*C08F 220/06* (2006.01)
*C08F 220/58* (2006.01)
*C08F 216/14* (2006.01)

(52) U.S. Cl.
CPC .................. *C08F 120/06* (2013.01); *C08F 2/32* (2013.01); *C08F 220/06* (2013.01); *C08F 220/58* (2013.01); *C09K 3/00* (2013.01); *C08F 216/1416* (2013.01)

(58) Field of Classification Search
CPC .................................................... Y10S 526/932
USPC .......................................................... 526/932
See application file for complete search history.

(56) References Cited

U.S. PATENT DOCUMENTS

| | | | | |
|---|---|---|---|---|
| 4,798,861 | A * | 1/1989 | Johnson et al. | 524/458 |
| 4,800,200 | A | 1/1989 | Tegeler et al. | |
| 4,800,220 | A | 1/1989 | Ribba | |
| 4,923,940 | A | 5/1990 | Hsu | |
| 5,180,798 | A | 1/1993 | Nakamura et al. | |
| 6,069,216 | A * | 5/2000 | Iwasaki et al. | 526/258 |
| 2003/0208020 | A1 * | 11/2003 | Daniel et al. | 526/317.1 |

FOREIGN PATENT DOCUMENTS

| | | |
|---|---|---|
| CN | 1023486 C | 1/1994 |
| CN | 1150223 C | 5/2005 |
| EP | 0 510 246 | 10/1992 |
| JP | 1-149805 | 6/1989 |
| JP | 3-227301 | 10/1991 |
| JP | 4-218582 | 8/1992 |
| JP | 4-323213 | 11/1992 |
| JP | 6-166725 | 6/1994 |

* cited by examiner

*Primary Examiner* — Mark Kaucher
*Assistant Examiner* — Kregg Brooks
(74) *Attorney, Agent, or Firm* — Hamre, Schumann, Mueller & Larson, P.C.

(57) ABSTRACT

Provide is a cross-linked polymer which is a polymer of a water-soluble ethylenically unsaturated monomer, the cross-linked polymer being cross-linked by a water-soluble crosslinking agent. An aqueous liquid with a pH of 6.8 to 7.0 consisting of water and 1.0% by mass of the cross-linked polymer has an equilibrium compliance at 25° C. of $5.2 \times 10^{-4}$ to $1.0 \times 10^{-1}$ (1/Pa), while an aqueous liquid with a pH of 6.8 to 7.0 consisting of water and 0.2% by mass of a corresponding cross-linked polymer has a viscosity at 25° C. of 200 mPa·s or more.

4 Claims, No Drawings

HYDROPHILIC THICKENING AGENT AND METHOD OF PRODUCING SAME

TECHNICAL FIELD

The present invention relates to a hydrophilic thickener and a method of preparing the same.

BACKGROUND ART

Natural thickeners represented by xanthan gum, guar gum, and the like, semi-synthetic thickeners represented by hydroxyethylcellulose, carboxymethylcellulose, and the like, and synthetic thickener represented by carboxyvinyl polymer, polyethylene oxide, and the like have been widely used as hydrophilic thickeners.

Since a carboxyl-group-containing hydrophilic polymer such as a carboxyvinyl polymer exhibits an excellent thickening property even when used at a small amount, the hydrophilic polymer has been very properly used as a thickener, a dispersing agent, or an emulsion stabilizing agent, which is useful in various fields of industry including cosmetics, toiletries, and the like. The carboxyvinyl polymer is a polymer of a water-soluble ethylenically unsaturated monomer containing a carboxyl group and a vinyl group such as an acrylic acid, and may be cross-linked by an oil-soluble crosslinking agent such as pentaerythritol triallyl ether, etc.

In the conventional art, a carboxyl-group-containing hydrophilic polymer used as a hydrophilic thickener has been often prepared by a precipitation polymerization method using an organic solvent. In the precipitation polymerization method, polymer particles, which are insoluble in the organic solvent and precipitate along with the progress of the polymerization, are collected. The collected polymer particles are used as the thickener. Meanwhile, in a method of preparing a water-absorbent resin, the use of reversed-phase suspension polymerization has been studied (Patent Literature 1).

CITATION LIST

Patent Literature

[Patent Literature 1] Japanese Patent Laid-Open Publication No. H3-227301
[Patent Literature 2] Japanese Patent Laid-Open Publication No. H4-218582
[Patent Literature 3] Japanese Patent Laid-Open Publication No. H1-149805

SUMMARY OF INVENTION

Technical Problem

In general, a thickening property of polymer particles used as a hydrophilic thickener is closely associated with properties such as a size and shape of the polymer particles, and a crosslinking degree and molecular weight of a polymer. Therefore, to allow the polymer particles to exhibit the desired thickening property, it is necessary to precisely control these properties.

However, since the properties of the polymer particles obtained by the precipitation polymerization method are highly affected by solubility of the polymer to an organic solvent, it is very difficult to optionally control the properties of the polymer. Therefore, a hydrophilic thickener with a conventional carboxyl-group-containing hydrophilic polymer prepared by the precipitation polymerization method has a problem in that there are many limits in optimizing performance, such as the thickening property, of the polymer particles according to various applications having a difference in desired characteristics.

Accordingly, an object of the present invention is to provide a hydrophilic thickener capable of exhibiting an excellent thickening property even when used at a small amount and also easily adjusting the thickening property so as to be suitable for various applications.

Solution to Problem

The present invention provides a cross-linked polymer which is a polymer of a water-soluble ethylenically unsaturated monomer, the cross-linked polymer being cross-linked by a water-soluble crosslinking agent. An aqueous liquid with a pH of 6.8 to 7.0 consisting of water and 1.0% by mass of the corresponding cross-linked polymer has an equilibrium compliance at 25° C. of $5.2 \times 10^{-4}$ to $1.0 \times 10^{-1}$ (1/Pa). The aqueous liquid with a pH of 6.8 to 7.0 consisting of water and 0.2% by mass of the cross-linked polymer has a viscosity at 25° C. of 200 mPa·s or more. When the cross-linked polymer includes a monomer unit derived from carboxylate or sulfonate, a mass of a monomer unit derived from carboxylic acid or sulfonic acid corresponding to the carboxylate or sulfonate is referred to as the mass of each monomer unit, to calculate a concentration (% by mass) of the cross-linked polymer in the aqueous liquid. Also, the present invention provides a hydrophilic thickener comprising the cross-linked polymer.

According to the findings of the present inventors, when the equilibrium compliance and viscosity of the aqueous liquid consisting of the cross-linked polymer and water simultaneously fall within the specific range, a sufficiently high thickening property can be obtained even at a small amount of use. In addition, the cross-linked polymer according to the present invention is cross-linked by a water-soluble crosslinking agent, and thus can be easily prepared by a suspension polymerization method. According to the suspension polymerization method, the cross-linked polymer can be obtained as the polymer particles having physical properties such as a desired particle diameter, a cross linking degree, a molecular weight, and the like by altering polymerization conditions such as a stirring speed, etc. As a result, the thickening property can be easily adjusted so as to be suitable for various applications.

The water-soluble crosslinking agent preferably includes at least one compound selected from the group consisting of N,N'-methylenebisacrylamide, ethylene glycol dimethacrylate, ethylene glycol diglycidyl ether, polyethylene glycol dimethacrylate, polyethylene glycol diglycidyl ether, and a water-soluble sucrose allyl ether. Especially, the water-soluble crosslinking agent more preferably includes a water-soluble sucrose allyl ether. The water-soluble sucrose allyl ether preferably has an etherification degree of 1.8 to 4.0.

The water-soluble ethylenically unsaturated monomer preferably includes at least one compound selected from the group consisting of acrylic acid and a salt thereof, methacrylic acid and a salt thereof, 2-acrylamide-2-methylpropane sulfonic acid and a salt thereof, acrylamide, methacrylamide, and N,N-dimethylacrylamide.

In another aspect, the present invention relates to a method of preparing a hydrophilic thickener including the cross-linked polymer. The method includes polymerizing a water-soluble ethylenically unsaturated monomer in the presence of a water-soluble sucrose allyl ether by a reversed-phase suspension polymerization method, thereby producing the cross-linked polymer which is a polymer of the water-soluble ethylenically unsaturated monomer, the cross-linked polymer being cross-linked by the water-soluble sucrose allyl ether.

According to the preparation method according to the present invention, it is possible to prepare a hydrophilic thickener capable of exhibiting an excellent thickening property even when used at a small amount and also easily adjusting the thickening property so as to be suitable for various applications.

Advantageous Effects of Invention

According to the present invention, a hydrophilic thickener capable of exhibiting an excellent thickening property even when used at a small amount and also easily adjusting the thickening property so as to be suitable for various applications can be provided.

DESCRIPTION OF EMBODIMENTS

Hereinafter, preferred embodiments of the present invention will be described in detail. However, the present invention is limited to the scope of the following embodiments.

A cross-linked polymer according to the present embodiment is a polymer composed of one or two or more water-soluble ethylenically unsaturated monomers, and is cross-linked by a water-soluble crosslinking agent. The cross-linked polymer is used as a hydrophilic thickener generally in the form of polymer particles. When the polymer particles are added to water or an aqueous liquid including water, a swollen gel in the form of particles is formed, so that the viscosity of the aqueous liquid increases.

An aqueous liquid consisting of the cross-linked polymer according to the present embodiment and water, when the concentration of the corresponding cross-linked polymer is 1.0% by mass, an equilibrium compliance at 25° C. of the aqueous liquid with a pH of 6.8 to 7.0 is preferably in a range of $5.2 \times 10^{-4}$ to $1.0 \times 10^{-1}$ (1/Pa). Also, when the concentration of the cross-linked polymer is 0.2% by mass, a viscosity at 25° C. of the aqueous liquid with a pH of 6.8 to 7.0 is preferably equal to or greater than 200 mPa·s. The viscosity is more preferably equal to or less than 100,000 mPa·s. Combination of the equilibrium compliance value and the thickening property at the concentration of 0.2% by mass is characteristic of the cross-linked polymer.

The equilibrium compliance is a measure of softness, and a higher equilibrium compliance value means that a mixture of the cross-linked polymer and water is soft. Generally, the equilibrium compliance may refer to the reciprocal of modulus of elasticity. When the equilibrium compliance is low, a thickening effect tends to be degraded due to decreased fluidity as the hydrophilic thickener. From this point of view, the equilibrium compliance is more preferably equal to or greater than $5.5 \times 10^{-4}$. When the equilibrium compliance is too high, the thickening effect tends to be lowered. From this point of view, the equilibrium compliance is more preferably equal to or less than $1.0 \times 10^{-1}$. An upper limit and a lower limit of the equilibrium compliance may be $1.00 \times 10^{-2}$, $4.93 \times 10^{-3}$, $5.60 \times 10^4$, $9.80 \times 10^4$, $3.00 \times 10^{-3}$, $5.50 \times 10^{-3}$, $1.10 \times 10^{-3}$, or $5.20 \times 10^{-3}$.

The viscosity of the aqueous liquid including the cross-linked polymer is an index of the thickening property, and a thickening effect by the cross-linked polymer becomes high as the value of the viscosity of the aqueous liquid increases. The cross-linked polymer starts to increase in viscosity from a very low concentration of 0.2% by mass, and exhibits a good thickening property when added at a small content of approximately 0.5% by mass, which is a generally used content for a thickener. Meanwhile, when the value of the viscosity is too high, a time-dependent change in viscosity tends to increase due to degraded stability in viscosity of the aqueous liquid. At the same time, the aqueous liquid has practical problems in that an unmixed-in lump may be easily formed upon preparation of the aqueous liquid, and it is very difficult to handle the aqueous liquid, etc. From this point of view, the viscosity of the aqueous liquid at a content of 0.2% by mass is more preferably in a range of 300 to 50,000 mPa·s. An upper limit and lower limit of the viscosity of the aqueous liquid at a content of 0.2% by mass may be 4,000 mPa·s, 1,500 mPa·s, 600 mPa·s, 900 mPa·s, 800 mPa·s, 750 mPa·s, 1200 mPa·s, or 1600 mPa·s.

Upon measurement of the equilibrium compliance or viscosity, a pH value of the aqueous liquid including the cross-linked polymer is adjusted to 6.8 to 7.0 using a pH adjusting agent, as necessary. For example, the pH adjusting agent may include sodium hydroxide, potassium hydroxide, ammonia, and organic amines.

The water-soluble ethylenically unsaturated monomer is, although not particularly limited, preferably at least one compound selected from the group consisting of acrylic acid and a salt thereof, methacrylic acid and a salt thereof, 2-acrylamide-2-methylpropane sulfonic acid and a salt thereof, acrylamide, methacrylamide, and, N,N-dimethylacrylamide. Among these, monomers containing a carboxyl group, that is, acrylic acid and a salt thereof, and methacrylic acid and a salt thereof, are preferred in an aspect of ensuring a sufficient thickening property.

The water-soluble crosslinking agent is preferably a compound containing two or more polymerizable unsaturated groups and/or reactive functional groups. The reactive functional group is a functional group that may react with a functional group such as a carboxyl group included in the water-soluble ethylenically unsaturated monomer, and may form a cross-linking structure. Specific examples of the reactive functional group include a glycidyl group. Examples of the water-soluble crosslinking agent containing two or more glycidyl groups include ethylene glycol diglycidyl ether, and polyethylene glycol diglycidyl ether. Examples of the water-soluble crosslinking agent containing two or more polymerizable unsaturated groups include N,N'-methylenebisacrylamide, ethylene glycol dimethacrylate, polyethylene glycol dimethacrylate, and a water-soluble sucrose allyl ether.

Conventionally, the sucrose allyl ether is synthesized by a method in which sucrose is allyl-etherified with allyl bromide or the like in the presence of an alkali catalyst. In this case, an oil-soluble or water-soluble sucrose allyl ether may be obtained depending on the etherification degree. A highly substituted oil-soluble (hydrophobic) sucrose allyl ether having an etherification degree of 5.0 to 8.0 is being widely used, like pentaerythritol triallyl ether, as a crosslinking agent for a carboxyvinyl polymer according to a precipitation polymerization method using an organic solvent. Meanwhile, according to the present embodiment, the etherification degree of the water-soluble sucrose allyl ether used as the crosslinking agent is in a range of approximately 1.8 to 4.0. The etherification degree is an average value of a molar ratio of an allyl ether group with respect to sucrose. The etherification degree can be calculated, for example, from an amount of an acetic anhydride consumed by allowing a hydroxyl group present in the sucrose allyl ether to react with an acetic anhydride in pyridine. The etherification degree of the sucrose allyl ether is at most 8.0, as seen from a chemical structure thereof.

When the etherification degree of the water-soluble sucrose allyl ether is low, there is a tendency where an allyl group as a functional group to engage with a cross-linking reaction is insufficient in amount, which makes it difficult to effectively perform the cross-linking reaction. When the etherification degree of the water-soluble sucrose allyl ether is high, there is a tendency where solubility in water is degraded, which makes it difficult to perform a cross-linking reaction between the sucrose allyl ether and the water-soluble ethylenically unsaturated monomer in an aqueous phase. From this point of view, the etherification degree of the water-soluble sucrose allyl ether is preferably in a range of 2.0 to 3.5, and, more preferably 2.2 to 3.2.

For example, the water-soluble sucrose allyl ether may be obtained by adding a sodium hydroxide catalyst to a sucrose aqueous solution to transform sucrose into alkaline sucrose, and then dropping allyl bromide to etherify the alkaline sucrose. In this case, the water-soluble sucrose allyl ether can be effectively obtained by adjusting a content of the allyl bromide within a molar range of 2 to 6 times, preferably 2 to 5 times that of the sucrose. A reaction temperature of the etherification is, for example, approximately 80° C. In general, the reaction is completed in approximately 3 hours after dropping of the allyl bromide. The water-soluble sucrose allyl ether can be collected by adding an alcohol to the aqueous phase separated from the reaction solution, filtering off precipitating salts, and then distilling off the excess alcohol and moisture.

An amount of the water-soluble crosslinking agent used to obtain the cross-linked polymer is preferably in a range of 0.01 to 2.0% by mass, more preferably 0.02 to 1.0% by mass, and further preferably 0.05 to 1.0% by mass, with respect to the water-soluble ethylenically unsaturated monomer. When the amount of the water-soluble crosslinking agent is small, the cross-linking reaction may not be sufficiently performed. When the amount of the water-soluble crosslinking agent is too high, cross-linking may excessively occur, which makes it difficult to obtain polymer particles having a suitable swelling property. When a carboxylate such as acrylate or methacrylate, or a sulfonate such as 2-acrylamide-2 methylpropane sulfonate is used as the water-soluble ethylenically unsaturated monomer, the ratio of the water-soluble crosslinking agent is calculated based on the mass of carboxylic acid or sulfonic acid corresponding to the carboxylate or the sulfonate.

The cross-linked polymer according to the present embodiment can be obtained, for example, by a method including polymerizing the water-soluble ethylenically unsaturated monomer in the presence of the water-soluble crosslinking agent by a suspension polymerization method. Among suspension polymerization methods, a reversed-phase suspension polymerization method, in which a polymerization reaction is performed while dispersing droplets of an aqueous phase including the water-soluble ethylenically unsaturated monomer, the water-soluble crosslinking agent and water in a hydrophobic solvent, is preferred.

For example, a petroleum hydrocarbon solvent selected from the group consisting of an aliphatic hydrocarbon, an alicyclic hydrocarbon and an aromatic hydrocarbon is used as the hydrophobic solvent used in the reversed-phase suspension polymerization. The aliphatic hydrocarbon may include n-pentane, n-hexane, n-heptane and the like. The alicyclic hydrocarbon may include cyclopentane, methylcyclopentane, cyclohexane, methylcyclohexane and the like. The aromatic hydrocarbon may include benzene, toluene, xylene and the like. Especially, at least one hydrophobic solvent selected from the group consisting of n-hexane, n-heptane, cyclohexane and toluene is very preferably used as a general-purpose industrial solvent. The ratio of the hydrophobic solvent is, for example, in a range of 100 to 200 parts by mass, with respect to 100 parts by mass of the aqueous phase including the water-soluble ethylenically unsaturated monomer, and the like.

The aqueous phase including the water-soluble ethylenically unsaturated monomer, or the hydrophobic solvent may include other components such as a surfactant and a radical initiator.

The surfactant is mainly used to stabilize a suspension state during polymerization. The surfactant is not particularly limited as long as it is conventionally used for reversed-phase suspension polymerization. Preferably, one or more of surfactant selected from the group consisting of a sorbitan fatty acid ester, a polyglycerol fatty acid ester, a sucrose fatty acid ester, a sorbitol fatty acid ester, a modified polyethylene wax, a modified polypropylene wax, a polyvinylalcohol, a polyethylene oxide, a cellulose ether (hydroxyethylcellulose, ethylcellulose, etc.), a sodium alkylbenzene sulfonate, and a polyoxyethylene alkylphenyl ether sulfate is used.

An amount of the surfactant is preferably in a range of 0.1 to 10.0% by mass, and more preferably 0.5 to 5.0% by mass, with respect to the water-soluble ethylenically unsaturated monomer. When the amount of the surfactant is small, there is a probability of causing a problem regarding the stability in suspension state upon polymerization. When the amount of the surfactant is high, it tends to be disadvantageous in an economical aspect.

The radical initiator is not particularly limited as long as it is used for conventional radical polymerization. However, potassium persulfate, ammonium persulfate, sodium persulfate and an azo-based initiator are very preferably used as the radical initiator. For example, 2,2'-azobis(2-methylpropionamidine)dihydrochloride can be used as the radical initiator.

An amount of the radical initiator is preferably in a range of 0.01 to 0.5% by mass, and more preferably 0.02 to 0.2% by mass, with respect to the water-soluble ethylenically unsaturated monomer. When the amount of the radical initiator is small, there is a tendency where a polymerization reaction is not easily performed, or a long reaction time is needed. When the amount of the radical initiator is too high, there is a probability of causing a drastic polymerization reaction, which makes it difficult to handle the process.

During the reversed-phase suspension polymerization, the size of the droplets including the water-soluble ethylenically unsaturated monomer is closely related to the size of the polymer particles to be obtained. The size of the droplets may vary according to conditions such as a reaction vessel and a production scale. However, when a 2 L flask is used as the reaction vessel, for example, there is a high probability of producing the polymer particles having a size suitable for the objects of the present invention by performing the reversed-phase suspension polymerization under conditions such as a stirring speed of 600 to 1,000 revolutions/min. Also, the molecular weight and cross linking degree of the cross-linked polymer can be adjusted according to the amount of the water-soluble crosslinking agent to be added. As described above, when the size, molecular weight and cross linking degree of the polymer particles are controlled by adjusting the stirring speed and the amount of the added water-soluble crosslinking agent during a polymerization reaction, the characteristics serving as the hydrophilic thickener can be easily optimized according to each application.

The other conditions of the polymerization reaction, for example, an amount of the radical initiator, a polymerization reaction temperature, a reaction time, and the like, are also properly adjusted. The polymerization reaction temperature is, for example, in a range of 50 to 80° C., and the reaction time is, for example, in a range of 30 minutes to 3 hours. For example, when the 2 L flask is used as the reaction vessel, a polymerization reaction can be initiated by adjusting a bath temperature of it at 60° C. In this case, initiation of the polymerization reaction can be checked from the fact that a temperature in the reaction vessel increases to approximately 70° C. due to the heat of polymerization. Thereafter, the polymerization reaction is usually completed by performing an aging reaction for approximately 30 minutes to 3 hours. When the aging reaction time is shorter than this reaction time, the reaction may not be sufficiently completed, and the residual water-soluble ethylenically unsaturated monomer may increase in amount. After the aging reaction, a desired product can be obtained by raising the bath temperature to distill off the water and petroleum hydrocarbon solvent in the reaction vessel.

As described above, in the reaction of precipitation polymerization of the carboxyvinyl polymer using a conventional organic solvent, precipitation of the polymer that has obtained a high molecular weight along with the progress of the polymerization takes place. Any further reaction does not nearly take place in the polymer particles which are in a precipitated state once. For this reason, in the precipitation polymerization method, a cross-linking reaction should be more effectively performed while maintaining the solubility in the organic solvent by increasing an allyl etherification degree of sucrose to convert the sucrose into oil-soluble sucrose.

Meanwhile, in the case of the reversed-phase suspension polymerization method, by using the water-soluble crosslinking agent, an uniform condition is maintained until the reaction is completed without causing precipitation of the polymer that has obtained a high molecular weight during the polymerization reaction Therefore, it may be considered that the cross-linking reaction is effectively performed even when a poorly substituted water-soluble sucrose allyl ether having fewer cross-linking points than the conventional oil-soluble sucrose allyl ether is used.

The particles of the conventional cross-linked polymer of water-soluble ethylenically unsaturated monomers having an acid group such as acrylic acid are dispersed in water, neutralized with an alkali such as sodium hydroxide to form a swollen gel, and then used as a hydrophilic thickener for various applications. That is, to utilize the cross-linked polymer as the hydrophilic thickener, complicated processes including dispersion and neutralization are required. Moreover, it is necessary to add the polymer particles while carefully stirring a gel to prevent an unmixed-in lump of the gel in the dispersion process, and thus it is difficult to say that the thickener is easy to handle.

Thickeners that do not require the neutralization process since carboxyl groups are neutralized in advance with an alkali have also been proposed (Patent Literatures 2 and 3). However, such thickeners are prepared into products by preparing a carboxyvinyl polymer in advance, followed by subjecting the carboxyvinyl polymer to processes such as neutralization, concentration and separation in a solvent. Therefore, since the preparation method is complicated, it is highly problematic in a practical aspect. Also, since the carboxyvinyl polymer is by a conventional precipitation polymerization method in which a polymer is precipitated in an organic solvent, properties of the polymer particles are not sufficiently controlled as in the present embodiment.

On the other hand, as in the present embodiment, when the water-soluble ethylenically unsaturated monomer having an acid group is neutralized in advance with an alkali and then subjected to a reversed-phase suspension polymerization method, the dispersion and neutralization processes are not required, and thus a hydrophilic thickener which itself can be added to the product for the purpose of thickening can be obtained from a polymerization process. Also, the hydrophilic thickener exhibits good workability due to excellent powder flowability of the product, and exhibits high usability such that the desired viscosity can be obtained by merely directly adding the hydrophilic thickener to the product and dissolving it. Its industrial advantages is quite high.

EXAMPLES

Hereinafter, the present invention will be described in further detail with reference to examples. However, the present invention is not limited by the scope of the following examples.

Preparative Example 1

Synthesis of Water-Soluble Sucrose Allyl Ether 86 g of ion exchange water and 40 g (1 mole) of sodium hydroxide were added to a 1 L four-necked separable flask equipped with a stirrer, a reflux condenser and a dropping funnel to dissolve the sodium hydroxide in the ion exchange water. 68.4 g (0.2 moles) of sucrose was further added, and reacted at 80° C. for 90 minutes while stirring to obtain an alkaline sucrose aqueous solution. 121 g (1 mole) of allyl bromide was added dropwise into the alkaline sucrose aqueous solution for 2 hours while controlling rapid heating caused by an etherification reaction Thereafter, the etherification reaction was completed by aging the reaction solution at 80° C. for 3 hours. After cooling, 400 g of ion exchange water was added to the reaction solution taken from the separable flask, and unwanted oils were removed to obtain 700 g of a crude sucrose allyl ether aqueous solution. Hydrochloric acid was further added to adjust a pH value to 7, and the aqueous solution was then concentrated to 240 g using a rotary evaporator. Salts, such as sodium bromide and the like, which were by-products, were removed from the aqueous solution by adding 200 g of ethanol, followed by performing precipitation and filtration. Subsequently, 88 g of purified water-soluble sucrose allyl ether was obtained by distilling an excessive amount of water from the aqueous solution using a rotary evaporator. Here, the etherification degree of the water-soluble sucrose allyl ether was 2.8.

Preparative Example 2

Synthesis of Oil-Soluble Sucrose Allyl Ether 96 g of ion exchange water and 96 g (2.4 moles) of sodium hydroxide were added to a 1 L four-necked separable flask equipped with a stirrer, a reflux condenser and a dropping funnel to dissolve the sodium hydroxide in the ion exchange water. 68.4 g (0.2 moles) of sucrose was further added, and reacted at 80° C. for 90 minutes while stirring to obtain an alkaline sucrose aqueous solution. 290 g (2.4 moles) of allyl bromide was added dropwise into the alkaline sucrose aqueous solution for 2 hours while controlling rapid heating caused by an etherification reaction. Thereafter, the etherification reaction was completed by aging the reaction solution at 80° C. for 3 hours. After cooling, 400 g of ion exchange water was added to the reaction solution taken from the separable flask, and unwanted water-soluble components were removed from the oils to obtain crude oil-soluble sucrose allyl ether. Subsequently, 250 g of ion exchange water was added, and volatile components formed as the by-products were distilled off together with water using a rotary evaporator. 120 g of n-hexane and 40 g of ion exchange water were further added, and water-soluble impurities were removed again through liquid separation. The n-hexane was distilled off from the separated oily phase using a rotary evaporator to obtain 110 g of purified oil-soluble sucrose allyl ether. The etherification degree of the oil-soluble sucrose allyl ether was 6.5.

Example 1

90 g of an aqueous solution including acrylic acid at a content of 80% by mass was added into a 500 mL Erlenmeyer flask, and 94 g of an aqueous solution including sodium hydroxide at a content of 30% by mass was added dropwise, while cooling the flask in an external environment, to neutralize the aqueous solution. Also, 56 g of ion exchange water, 0.09 g of the poorly substituted water-soluble sucrose allyl ether (corresponding to 0.1% by mass with respect to the acrylic acid aqueous solution) prepared in Preparative Example 1 serving as a crosslinking agent, and 0.064 g of 2,2'-azobis(2-methylpropionamidine)dihydrochloride (V-50, by Wako Pure Chemical Industries Ltd.) serving as an initiator were added to prepare a water-soluble ethylenically unsaturated monomer aqueous solution. Separately, 330 g of n-heptane was added to a 2 L four-necked separable flask equipped with a stirrer, a reflux condenser, a dropping funnel and a nitrogen gas inlet tube, 2.7 g of sucrose stearate ester (S-370, by Mitsubishi Chemical Foods Co., Ltd.) as a surfactant was further dispersed and dissolved. The previously prepared water-soluble ethylenically unsaturated monomer aqueous solution was added thereto, and an inner part of the system was substituted with nitrogen while stirring at a stirring speed of 1,000 revolutions/min. At the same time, the bath temperature was maintained at 60° C., and polymerization was performed for an hour by a reversed-phase suspension polymerization method. When the polymerization was completed, water and n-heptane were distilled off to obtain 103 g of powder of the cross-linked polymer.

Example 2

102 g of powder of the cross-linked polymer was obtained in the same manner as in Example 1, except that the added amount of the water-soluble sucrose allyl ether prepared in Preparative Example 1 was changed to 0.35 g (corresponding to 0.4% by mass with respect to the acrylic acid aqueous solution).

Example 3

102 g of powder of the cross-linked polymer was obtained in the same manner as in Example 1, except that the added amount of the water-soluble sucrose allyl ether prepared in Preparative Example 1 was changed to 0.35 g (corresponding to 0.4% by mass with respect to the acrylic acid aqueous solution), and an added amount of the 2,2'-azobis(2-methylpropionamidine)dihydrochloride (V-50, by Wako Pure Chemical Industries Ltd.) was changed to 0.036 g.

Example 4

100 g of powder of the cross-linked polymer was obtained in the same manner as in Example 1, except that the added amount of the water-soluble sucrose allyl ether prepared in Preparative Example 1 was changed to 0.7 g (corresponding to 0.8% by mass with respect to the acrylic acid aqueous solution).

Example 5

103 g of powder of the cross-linked polymer was obtained in the same manner as in Example 3, except that the stirring speed during the polymerization was changed to 800 revolutions/min.

Example 6

104 g of powder of the cross-linked polymer was obtained in the same manner as in Example 3, except that the stirring speed during the polymerization was changed to 600 revolutions/min.

Example 7

100 g of powder of the cross-linked polymer was obtained in the same manner as in Example 1, except that the crosslinking agent was changed to 0.09 g of the water-soluble N,N'-methylenebisacrylamide (corresponding to 0.1% by mass with respect to the acrylic acid aqueous solution).

Example 8

101 g of powder of the cross-linked polymer was obtained in the same manner as in Example 1, except that the crosslinking agent was changed to 0.35 g of the water-soluble ethylene glycol diglycidyl ether (corresponding to 0.4% by mass with respect to the acrylic acid aqueous solution).

Comparative Example 1

90 g of an aqueous solution of acrylic acid at a content of 80% by mass was added into a 500 mL Erlenmeyer flask, and 94 g of an aqueous solution of sodium hydroxide at a content of 30% by mass was added dropwise, while cooling the flask in an external environment, to neutralize the aqueous solution. Further, 56 g of ion exchange water, 0.26 g of oil-soluble pentaerythritol triallyl ether (corresponding to 0.3% by mass with respect to the acrylic acid aqueous solution) as a crosslinking agent, and 0.064 g of 2,2'-azobis(2-methylpropionamidine)dihydrochloride (V-50, by Wako Pure Chemical Industries Ltd.) as an initiator, were added to prepare a water-soluble ethylenically unsaturated monomer aqueous solution. Separately, 330 g of n-heptane was added to a 2 L four-necked separable flask equipped with a stirrer, a reflux condenser, a dropping funnel and a nitrogen gas inlet tube, 2.7 g of sucrose stearate ester (S-370, by Mitsubishi Chemical Foods Co., Ltd.) was further dispersed and dissolved as a surfactant. The previously prepared water-soluble ethylenically unsaturated monomer aqueous solution was added thereto, and an inner part of the system was substituted with nitrogen while stirring at a stirring speed of 1,000 revolutions/min. At the same time, the bath temperature was maintained at 60° C., and polymerization was performed for an hour. When the polymerization was completed, water and n-heptane were distilled off to obtain 102 g of powder of the cross-linked polymer.

Comparative Example 2

101 g of powder of the cross-linked polymer was obtained in the same manner as in Example 1, except that the crosslinking agent was changed to oil-soluble pentaerythritol triallyl ether at an amount of 0.52 g (corresponding to 0.6% by mass with respect to the acrylic acid aqueous solution).

Comparative Example 3

101 g of powder of the cross-linked polymer was obtained in the same manner as in Example 1, except that the crosslinking agent was changed to oil-soluble sucrose allyl ether prepared in Preparative Example 2 at an amount of 0.35 g (corresponding to 0.4% by mass with respect to the acrylic acid aqueous solution).

Comparative Example 4

103 g of powder of the cross-linked polymer was obtained in the same manner as in Example 1, except that the crosslinking agent was changed to oil-soluble sucrose allyl ether prepared in Preparative Example 2 at an amount of 0.87 g (corresponding to 1.0% by mass with respect to the acrylic acid aqueous solution).

Comparative Example 5

102 g of powder of the cross-linked polymer was obtained in the same manner as in Example 1, except that the crosslinking agent was changed to water-soluble ethylene glycol diglycidyl ether at an amount of 1.93 g (corresponding to 2.1% by mass with respect to the acrylic acid aqueous solution).

Comparative Example 6

100 g of powder of the cross-linked polymer was obtained in the same manner as in Example 1, except that the crosslinking agent was changed to water-soluble N,N'-methylenebisacrylamide at an amount of 0.005 g (corresponding to 0.006% by mass with respect to the acrylic acid aqueous solution).

Measurement of Gel Size of Swollen Gel

Each of the cross-linked polymers was added to water to prepare an aqueous liquid for measurement of a gel size, which included a swollen gel at a concentration of 0.05% by mass. When the cross-linked polymer included a monomer unit derived from acrylate, methacrylate, or 2-acrylamide-2-methylpropane sulfonate, the mass of the monomer unit derived from acrylic acid, methacrylic acid or 2-acrylamide-2-methylpropane sulfonic acid corresponding to the carboxylate, the methacrylate or the 2-acrylamide-2-methylpropane sulfonate was referred to as the mass of each monomer unit, and a concentration (% by mass) of the cross-linked polymer (swollen gel) was calculated. The pH values of the respective aqueous liquids were in a range of 6.8 to 7.0. For the obtained aqueous liquids, a particle diameter distribution of the swollen gel was measured by a laser diffraction/scattering method using a particle size distribution measuring apparatus (SALD2000 Flow Cell commercially available from Shimadzu Corporation), and an average particle diameter calculated from the obtained particle diameter distribution was referred to as a size of the swollen gel.

Viscosity of Aqueous Liquid Including Cross-Linked Polymer

Each of the cross-linked polymers was added to water to prepare an aqueous liquid including the swollen gel at a concentration of 0.5% by mass or 0.2% by mass. When the cross-linked polymer included a monomer unit derived from acrylate, methacrylate, or 2-acrylamide-2-methylpropane sulfonate, the mass of the monomer unit derived from acrylic acid, methacrylic acid or 2-acrylamide-2-methylpropane sulfonic acid corresponding to the carboxylate, the methacrylate or the 2-acrylamide-2-methylpropane sulfonate was referred to as the mass of each monomer unit, and a concentration (% by mass) of the cross-linked polymer (swollen gel) was calculated. The pH values of the respective aqueous liquids were in a range of 6.8 to 7.0. The viscosities of the obtained aqueous liquids were measured under conditions of a temperature of 25° C. and Rotor NO. 6 (20 revolutions/min) using a viscometer (Bisumetoron VS-1H, by Shibaura System Co., Ltd.), and the values of the viscosities one minute after initiation of the measurement were read.

Equilibrium Compliance

Each of the cross-linked polymers was added to water to prepare an aqueous liquid including the swollen gel at a concentration of 1.0% by mass. When the cross-linked polymer included a monomer unit derived from acrylate, methacrylate or 2-acrylamide-2-methylpropane sulfonate, the mass of the monomer unit derived from acrylic acid, methacrylic acid or 2-acrylamide-2-methyl propane sulfonic acid corresponding to the acrylate, the methacrylate or the 2-acrylamide-2-methylpropane sulfonate was referred to as the mass of each monomer unit, and a concentration (% by mass) of the cross-linked polymer (swollen gel) was calculated. The pH values of the respective aqueous liquids were in a range of 6.8 to 7.0. The creep measurement was conducted on the obtained aqueous liquids under conditions including a temperature of 25° C., a 40 mm parallel plate, a gap distance of 500 or 1,000 µm, and an applied stress of 0.01 to 10 Pa using a rheometer (AR-2000ex, by TA Instruments). In this case, the compliance when it reached an equilibrium having a distortion tolerance of 2% or less was referred to as the equilibrium compliance. The conditions such as a gap distance, an applied stress and the like were properly set to correspond to the conditions suitable for the respective sample solutions. When the equilibrium compliance fell within a measurable range, the equilibrium compliance was a physical property value indicating a constant value regardless of the measurement conditions.

Table 1 lists the kind of crosslinking agents, the stirring speeds during polymerization, the sizes of swollen gels, and the viscosities and equilibrium compliances of aqueous sample solutions including a polymer added thereto regarding Examples and Comparative Examples.

TABLE 1

| | Crosslinking agent and added amount (with respect to mass of acrylic acid aqueous solution) | Stirring speed (rpm) | Size of swollen gel (μm) | Viscosity (0.5% by mass) (mPa·s) | Viscosity (0.2% by mass) (mPa·s) | Equilibrium compliance (1/Pa) |
|---|---|---|---|---|---|---|
| Example 1 | L-PAS (0.1% by mass) | 1,000 | 140 | 8,950 | 4,000 | $1.00 \times 10^{-2}$ |
| Example 2 | L-PAS (0.4% by mass) | 1,000 | 100 | 16,700 | 1,500 | $4.93 \times 10^{-3}$ |
| Example 3 | L-PAS (0.4% by mass) | 1,000 | 80 | 38,000 | 600 | $5.60 \times 10^{-4}$ |
| Example 4 | L-PAS (0.8% by mass) | 1,000 | 80 | 25,000 | 900 | $9.80 \times 10^{-4}$ |
| Example 5 | L-PAS (0.8% by mass) | 800 | 150 | 19,000 | 800 | $3.00 \times 10^{-3}$ |
| Example 6 | L-PAS (0.8% by mass) | 600 | 250 | 14,800 | 750 | $5.50 \times 10^{-3}$ |
| Example 7 | MBAA (0.1% by mass) | 1,000 | 100 | 22,400 | 1,200 | $1.10 \times 10^{-3}$ |
| Example 8 | EGDE (0.4% by mass) | 1,000 | 150 | 15,000 | 1,600 | $5.20 \times 10^{-3}$ |
| Comp. Example 1 | PETA (0.3% by mass) | 1,000 | Not measured | 2,760 | 1,100 | Not measured |
| Comp. Example 2 | PETA (0.6% by mass) | 1,000 | Not measured | 4,330 | 1,600 | Not measured |
| Comp. Example 3 | PAS (0.4% by mass) | 1,000 | Not measured | 4,100 | 1,650 | Not measured |
| Comp. Example 4 | PAS (1.0% by mass) | 1,000 | Not measured | 7,450 | 2,100 | Not measured |
| Comp. Example 5 | EGDE (2.1% by mass) | 1,000 | 50 | 4,000 | 60 | $5.00 \times 10^{-4}$ |
| Comp. Example 6 | MBAA (0.006% by mass) | 1,000 | 400 | 3,500 | 1,800 | $2.00 \times 10^{-1}$ |

L-PAS: Poorly substituted water-soluble sucrose allyl ether (etherification degree: 2.5)
MBAA: N,N'-methylenebisacrylamide
EGDE: Ethylene glycol diglycidyl ether
PETA: Oil-soluble pentaerythritol triallyl ether
PAS: Highly substituted oil-soluble sucrose allyl ether (etherification degree: 6.5)
Not measured: No swollen gel was obtained since a cross-linking reaction did not proceed. As a result, measurement of gel size and equilibrium compliance could not be performed. The aqueous liquid became a stringy viscous liquid.

As listed in Table 1, it was confirmed that the cross-linked polymers prepared in Examples, in which the equilibrium compliances of the aqueous liquids at a content of 1.0% by mass were in a range of $5.2 \times 10^{-4}$ to $1.0 \times 10^{-1}$ (1/Pa) and the viscosities of the aqueous liquids at a content of 0.2% by mass were equal to or greater than 200 mPa·s, had a sufficient thickening effect even when a used amount is small like 0.5% by mass. In the case of the cross-linked polymer prepared in Comparative Example 5 in which the equilibrium compliance of the aqueous liquid at a content of 1.0% by mass was less than $5.2 \times 10^{-4}$ (1/Pa), the swollen gel was not very soft, and did not swell significantly. As a result, when the cross-linked polymer was added to water, the aqueous liquid was not soft at all but became hard. Also, the viscosity of the aqueous liquid at a very low concentration of 0.2% by mass was less than 200 mPa·s, the thickening property was hardly exhibited, and the characteristics were highly different from those of the cross-linked polymer according to the present invention. In the case of the cross-linked polymer prepared in Comparative Example 6 in which the equilibrium compliance of the aqueous liquid at a content of 1.0% by mass was greater than $1.0 \times 10^{-1}$ (1/Pa), although the viscosity of the aqueous liquid at a content of 0.2% by mass was 200 mPa·s or more, since the swollen gel was too soft, the aqueous liquid at a content of 0.5% by mass generally used for a thickener had low viscosity, and the thickening effect was insufficient.

Hereinafter, the experimental results will be discussed in further detail.

For Examples 1, 2 and 4, the amounts of the water-soluble sucrose allyl ethers as the crosslinking agents were 0.1% by mass, 0.4% by mass, and 0.8% by mass, with respect to the water-soluble ethylenically unsaturated monomer (acrylic acid). As a result, the sizes of the swollen gels which are the cross-linked polymers were 140 μm, 100 μm or 80 respectively. Also, the viscosities of the aqueous liquid at a content of 0.5% by mass prepared in Examples 1, 2 and 4 were 8,950 mPa·s, 16,700 mPa·s and 25,000 mPa·s, respectively. Since the number of the cross-linking points in the formed polymer increased due to an increase in amount of the added crosslinking agent, a structure of the swollen gel of the cross-linked polymer became firm, thereby reducing the size of the swollen gel and enhancing the thickening effect. In Examples 1, 2 and 4, the equilibrium compliances of the aqueous liquids were $1.00 \times 10^{-2}$, $4.93 \times 10^{-3}$ and $9.80 \times 10^{-4}$, respectively, and were lowered according to an increase in amount of the added crosslinking agent. That is, the amount of the crosslinking agent can be altered to change the cross-linking structure of the swollen gel and adjust the thickening effect of the swollen gel.

For Examples 5 and 6, the stirring speed during the polymerization reaction was changed from 1,000 revolutions/min in Example 4 to 800 revolutions/min and 600 revolutions/min. When compared with Example 4 under the same other conditions, the sizes of the swollen gels increased from 80 μm to 150 μm or 250 μm, respectively. It could be seen that the diameter of the droplets increased during the polymerization since a mechanical shear rate was reduced due to stirring. The viscosities of the aqueous liquids at a content of 0.5% by mass prepared in Examples 4, 5 and 6 were 25,000 mPa·s, 19,000 mPa·s and 14,800 mPa·s. That is, when compared under charging conditions with the same amount of the crosslinking agent (the same cross linking degree), the thickening effect was improved as the swollen gel decreased in size. It could be seen that the contact area between the gels in the aqueous liquid increased as the swollen gel decreased in size. That is, the size of the swollen gel can changed to adjust the thickening effect according to the mechanical operation conditions upon production. The equilibrium compliance in Example 4 was $9.80 \times 10^{-4}$, whereas equilibrium compliances in Examples 5 and 6 were $3.00 \times 10^{-3}$ and $5.50 \times 10^{-3}$, respectively. That is, it was observed that the equilibrium compliances tended to increase in proportion to the size of the swollen gel, that is, the aqueous liquid tended to be soft.

In Example 7, the water-soluble N,N'-methylenebisacrylamide was used as the crosslinking agent at a content of 0.1% by mass, with respect to the water-soluble ethylenically unsaturated monomer. In Example 8, the water-soluble ethylene glycol diglycidyl ether was used as the crosslinking agent at a content of 0.4% by mass, with respect to the water-soluble ethylenically unsaturated monomer. As a result, the sizes of the swollen gels of the cross-linked polymers were 100 μm or 150 μm, respectively, and the viscosities of the aqueous liquid at a content of 0.5% by mass were 22,400 mPa·s or 15,000 mPa·s, respectively.

When the cross-linked polymer according to the present invention was used as the thickener, the thickening effect and the size of the swollen gel could be optionally controlled by combining the charging conditions of the water-soluble crosslinking agent with respect to the water-soluble ethylenically unsaturated monomer and the operation conditions such as stirring speed, etc.

Generally, the product thickened by the hydrophilic thickener is evaluated according to a value of viscosity regarding viscosity characteristics thereof. However, a tactile impression as a viscous material of the thickened product is affected by the size of the swollen gel together with the viscosity of it. When compared at the same viscosity, the thickened product has a more sticky tactile impression as the size of the swollen gel decreased, and has a more soft tactile impression as the size of the swollen gel increased. It could be seen that the contact area between the gels in the aqueous liquid increased as the size of the swollen gel decreased, thereby enhancing the pressure-sensitive adhesivity of the aqueous solution.

The oil-soluble (hydrophobic) crosslinking agent, which is used for preparation of the carboxyvinyl polymer by the precipitation polymerization method using an organic solvent, was used in Comparative Examples 1 to 4. The polymerization reaction was performed under the same conditions as those in the reversed-phase suspension polymerization method described in Examples. However, since the cross-linking reaction was not sufficiently performed by the oil-soluble crosslinking agent used, and the aqueous solution became a stringy viscous liquid, it was impossible to obtain a hydrophilic thickener exhibiting a sufficient thickening effect. This could be considered to be due to the fact that the oil-soluble crosslinking agent was not able to actively take part in the cross-linking reaction of the polymer since the oil-soluble crosslinking agent could not penetrate the aqueous droplets including acrylate during the reversed-phase suspension polymerization using the oil-soluble crosslinking agent.

In Comparative Example 5, the ethylene glycol diglycidyl ether was used as the water-soluble crosslinking agent at a content of 2.1% by mass, with respect to the water-soluble ethylenically unsaturated monomer. The equilibrium compliance was low at $5.00 \times 10^{-4}$, and the thickening effect obtained by the cross-linked polymer was also low. This could be considered to be due to the fact that the swollen gel was not very soft since the excessive number of the cross-linking points were present in the main chain of the cross-linked polymer.

In Comparative Example 6, the N,N'-methylenebisacrylamide was used as the water-soluble crosslinking agent at a content of 0.006% by mass, with respect to the water-soluble ethylenically unsaturated monomer. The equilibrium compliance was high at $2.00 \times 10^{-1}$, and the thickening effect obtained by the cross-linked polymer was low. This could be considered to be due to the fact that the swollen gel as the cross-linked polymer had a weak structure since the small number of the cross-linking points were present in the main chain of the cross-linked polymer.

INDUSTRIAL APPLICABILITY

The hydrophilic thickener according to the present invention can be preferably used to adjust thickening properties or rheology of aqueous products in various fields of industry such as cosmetics, toiletries, and the like.

The invention claimed is:

1. A cross-linked polymer which is a polymer of a water-soluble ethylenically unsaturated monomer, the cross-linked polymer being cross-linked by a water-soluble crosslinking agent,
   wherein an aqueous liquid with a pH of 6.8 to 7.0 consisting of water and 1.0% by mass of the cross-linked polymer has an equilibrium compliance at 25° C. of $5.2 \times 10^{-4}$ to $1.0 \times 10^{-1}$ (1/Pa), while an aqueous liquid with a pH of 6.8 to 7.0 consisting of water and 0.2% by mass of the cross-linked polymer has a viscosity at 25° C. of 200 mPa·s or more,
   wherein the water-soluble ethylenically unsaturated monomer consists of at least one compound selected from the group consisting of acrylic acid and a salt thereof, methacrylic acid and a salt thereof, 2-acrylamide-2-methylpropane sulfonic acid and a salt thereof, acrylamide, methacrylamide, and N,N-dimethylacrylamide, and
   wherein the water-soluble crosslinking agent comprises a water-soluble sucrose allyl ether, and
   wherein an amount of the water-soluble crosslinking agent is in a range of 0.1 to 2.0% by mass with respect to the water-soluble ethylenically unsaturated monomer.

2. The cross-linked polymer according to claim 1, wherein the water-soluble crosslinking agent further comprises at least one compound selected from the group consisting of N,N'-methylenebisacrylamide, ethylene glycol dimethacrylate, ethylene glycol diglycidyl ether, polyethylene glycol dimethacrylate, and polyethylene glycol diglycidyl ether.

3. A hydrophilic thickener comprising the cross-linked polymer according to claim 1.

4. A method of preparing a hydrophilic thickener according to claim 3, the method comprising:
   polymerizing a water-soluble ethylenically unsaturated monomer in the presence of a water-soluble sucrose allyl ether by a reversed-phase suspension polymerization method, thereby producing the cross-linked polymer which is a polymer of the water-soluble ethylenically unsaturated monomer, the cross-linked polymer being cross-linked by the water-soluble sucrose allyl ether, wherein the etherification degree of the water-soluble sucrose allyl is between 2.2 to 3.2.

* * * * *